US012695166B2

(12) United States Patent
Fu et al.

(10) Patent No.: US 12,695,166 B2
(45) Date of Patent: Jul. 28, 2026

(54) DIELECTRIC CAVITY RESONATOR AND A DIELECTRIC CAVITY FILTER HAVING THE SAME

(71) Applicant: Telefonaktiebolaget LM Ericsson (publ), Stockholm (SE)

(72) Inventors: Jun Fu, Beijing (CN); Weidong Wang, Beijing (CN); Honglan Wang, Beijing (CN); Xueyuan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 222 days.

(21) Appl. No.: 18/577,327

(22) PCT Filed: May 19, 2022

(86) PCT No.: PCT/CN2022/093899
§ 371 (c)(1),
(2) Date: Jan. 8, 2024

(87) PCT Pub. No.: WO2023/279861
PCT Pub. Date: Jan. 12, 2023

(65) Prior Publication Data

US 2024/0387970 A1 Nov. 21, 2024

(30) Foreign Application Priority Data

Jul. 9, 2021 (WO) ................ PCT/CN2021/105579

(51) Int. Cl.
*H01P 1/208* (2006.01)
*H01P 7/10* (2006.01)

(52) U.S. Cl.
CPC ............ *H01P 1/2086* (2013.01); *H01P 7/105* (2013.01)

(58) Field of Classification Search
CPC .... H01P 1/2084; H01P 1/2086; H01P 1/2082; H01P 7/105; H01P 7/10
(Continued)

(56) References Cited

U.S. PATENT DOCUMENTS 5,796,320 A 8/1998 Hattori et al.
2017/0077573 A1* 3/2017 Yuan ........................ H01P 1/207
(Continued)

FOREIGN PATENT DOCUMENTS

CN 102447153 A 5/2012
EP 1858109 A1 11/2007
(Continued)

OTHER PUBLICATIONS

Liang, Xiao-Peng , et al., "Modeling of Cylindrical Dielectric Resonators in Rectangular Waveguides and Cavities", Electrical Engineering Department, Univ. of Maryland, College Park, MD 20742, 1993, pp. 597-600.
(Continued)

*Primary Examiner* — Stephen E. Jones
(74) *Attorney, Agent, or Firm* — Murphy, Bilak & Homiller, PLLC

(57) ABSTRACT

The present disclosure relates to a dielectric cavity resonator, comprising: a metallic resonance cavity having a cuboid shape defining three orthogonal axes x, y, z substantially aligned with walls of the metallic resonance cavity and having a central axis extending in the z direction; a dielectric core provided in the metallic resonance cavity, the dielectric core comprising: a central part extending coaxially with respect to the central axis of the metallic resonance cavity; and four columnar parts arranged around the central part and integrally formed with the central part and each extending in the z direction and having a petal-like shape in an x-y cross-section perpendicular to the z direction, every two
(Continued)

adjacent columnar parts being spaced by a groove, the dielectric core being centrosymmetric and axisymmetric in each x-y cross-section perpendicular to the z direction, wherein the metallic resonance cavity has a square cross-section, and in each petal-like cross-section, each columnar part extends in a direction of an adjacent corner area of corresponding square cross-section of the metallic resonance cavity, and a height of the central part is not greater than a height of a main body of each columnar part when measured in the z direction. The present disclosure also relates to a dielectric cavity filter comprising the above-mentioned dielectric cavity resonator.

15 Claims, 11 Drawing Sheets

(58) Field of Classification Search
USPC ........................................................ 333/219.1
See application file for complete search history.

(56) References Cited

U.S. PATENT DOCUMENTS

| | | | | |
|---|---|---|---|---|
| 2017/0263996 | A1 | 9/2017 | Karhu | |
| 2021/0320391 | A1* | 10/2021 | Meng | H01P 7/06 |

FOREIGN PATENT DOCUMENTS

| | | | |
|---|---|---|---|
| EP | 1962370 | A1 | 8/2008 |
| EP | 3764461 | A1 | 1/2021 |
| JP | H07336103 | A | 12/1995 |
| JP | H10173414 | A | 6/1998 |
| JP | 2002026602 | A | 1/2002 |

OTHER PUBLICATIONS

Walker, Vanessa , et al., “Design of Triple Mode Resonator Transmission Filters”, IEEE Microwave and Wireless Components Letters, vol. 12, No. 6, Jun. 2002, pp. 215-217.

* cited by examiner

DIELECTRIC CAVITY RESONATOR AND A DIELECTRIC CAVITY FILTER HAVING THE SAME

TECHNICAL FIELD

The present disclosure generally relates to the technical field of communication device, and more particularly, to a dielectric cavity resonator and a dielectric cavity filter having the same.

BACKGROUND

This section introduces aspects that may facilitate better understanding of the present disclosure. Accordingly, the statements of this section are to be read in this light and are not to be understood as admissions about what is in the prior art or what is not in the prior art.

Base station (BS) is an important part of a mobile communication system. In traditional BS solution, a metal cavity filter unit (FU) is most recommended because of its high Q (quality) value and power handling performance. However, for a 5G advanced radio system, more challenges are arising in terms of the size and weight of FU.

In order to increase the Q value, the size of the cavity must be increased, which are not in accord with the basic design desire of smaller size. Multi-mode filter might be the only one solution for this contradiction between Q-factor and overall size. Under the same RF performance level, the size of the multi-mode cavity filter can be reduced by 30% as compared with a single mode cavity filter and the Q value of the multi-mode cavity filter is 30% higher than that of the single mode cavity filter in the same size.

One multi-mode cavity resonator can achieve the RF (radio frequency) performance that is provided by several cascaded single-mode cavity resonators, but with a size that is larger than one single-mode cavity resonator and smaller than the summed size of the several single-mode cavity resonators. Thus, both higher Q-factor and smaller size can be obtained by a multi-mode cavity resonator.

One of the problems with an existing multi-mode filter is that its band width is quite limited. Therefore, there is a need for a wide band filter which can meet the demand of the wideband radio. Also, for the existing multi-mode filter, currently there seems no method available for making full use of it with high efficiency and flexibility.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for fully making use of a multi-mode resonator with improved performance and also at reduced cost.

According to a first aspect of the disclosure, there is provided a dielectric cavity resonator, comprising: a metallic resonance cavity having a cuboid shape defining three orthogonal axes x, y, z substantially aligned with walls of the metallic resonance cavity and having a central axis extending in a z direction; a dielectric core provided in the metallic resonance cavity, the dielectric core comprising: a central part extending coaxially with respect to the central axis of the metallic resonance cavity; and four columnar parts arranged around the central part and integrally formed with the central part and each extending in the z direction and having a petal-like shape in an x-y cross-section perpendicular to the z direction, every two adjacent columnar parts being spaced by a groove, the dielectric core being centrosymmetric and axisymmetric in each x-y cross-section perpendicular to the z direction. The metallic resonance cavity has a square cross-section, and in each petal-like cross-section, each columnar part extends in a direction of an adjacent corner area of corresponding square cross-section of the metallic resonance cavity, and a height of the central part is not greater than a height of a main body of each columnar part when measured in the z direction.

In an embodiment of the disclosure, in each x-y cross-section, the groove opens towards a center segment of an adjacent side of a corresponding square cross-section of the metallic resonance cavity.

In an embodiment of the disclosure, the dielectric core is designed in such a shape that the number of the modes of the dielectric cavity resonator can be reduced by decreasing a ratio of the height of the central part to the height of the main body of the columnar part and/or a ratio of a cross-sectional characterizing dimension of the central part to the height of the central part.

In an embodiment of the disclosure, when a ratio of the height of the central part to the height of the main body of the columnar part is greater than 60% and no more than 100%, and a ratio of a cross-sectional characterizing dimension of the central part to the height of the central part is greater than 100%, the dielectric cavity resonator is a four-mode resonator.

In an embodiment of the disclosure, when a ratio of the height of the central part to the height of the main body of the columnar part is greater than 60% and no more than 100% and a ratio of a cross-sectional characterizing dimension of the central part to the height of the central part is greater than 40% and no more than 100%, the dielectric cavity resonator is a three-mode resonator.

In an embodiment of the disclosure, when a ratio of the height of the central part to the height of the main body of the columnar part is within 20%-60% and a ratio of a cross-sectional characterizing dimension of the central part to the height of the central part is within 20%-80%, the dielectric cavity resonator is a dual-mode resonator.

In an embodiment of the disclosure, a minimum distance between the dielectric core and walls of the metallic resonance cavity is within 1%-20%, preferably 3%-15% of a cross-sectional maximum side length of the dielectric core.

In an embodiment of the disclosure, the columnar parts and the central part are molded in one piece, and transition portions of the columnar parts that are located between the central part and the main bodys of the columnar parts each have a height same as or different from the height of the main bodys of the columnar parts.

In an embodiment of the disclosure, the dielectric core is made of a ceramic material which has a QF (quality× frequency) value of 8000-100000 and a relative permittivity of 18-100.

In an embodiment of the disclosure, the central part is round or square or in other regular shapes in an x-y cross-section perpendicular to the z direction.

In an embodiment of the disclosure, at an edge area of each columnar part that points to an adjacent corner area of the metallic resonant cavity, a notch is provided, extending in the z direction and opening towards the corner area.

In an embodiment of the disclosure, the notch is arc-shaped or shaped as a right angle in the x-y cross-section perpendicular to the z direction.

In an embodiment of the disclosure, a tuning screw is provided in each notch.

In an embodiment of the disclosure, the petal-like cross-section of each columnar part is generally square shaped.

In an embodiment of the disclosure, each columnar part is provided with a hole extending in the z direction for receiving a tuning screw.

In an embodiment of the disclosure, the central part has a central hole formed therein as an installation hole or a hole for receiving a tuning screw.

In an embodiment of the disclosure, a support member is provided within the metallic resonance cavity for supporting the dielectric core.

According to a second aspect of the disclosure, there is provided a dielectric cavity filter, comprising a dielectric cavity resonator as mentioned in the above.

In an embodiment of the disclosure, it comprises a first coaxial resonator and a second coaxial resonator placed on opposite sides of the dielectric cavity resonator, the first and second coaxial resonators being coupled to the dielectric cavity resonator via coupling windows.

In an embodiment of the disclosure, the coupling windows are in the form of apertures that are opened in the z direction and have at least one concave portion and at least one convex portion provided on their bottoms.

According to the present disclosure, the dielectric core which is made of a ceramic material with high dielectric constant and placed in a closed metallic cavity, can form a dual mode/triple-mode/four mode resonance by making minor adjustments on the shape/size of the dielectric core. This multi-mode adjustable resonator can be implemented in a single physical body, which also has the advantages of an improved Q-factor, less insertion loss, improved harmonic performance and enhanced power capacity as compared with same sized single-mode metal or ceramic filter. With the dielectric cavity resonator according to the present disclosure, the volume can be reduced by 30%-50% if same performance requirement is imposed on both the multi-mode adjustable resonator and the existing single-mode filter.

The dielectric cavity filter according to the present disclosure can realize the filtering function by one or more single-mode resonating blocks and one or more triple-mode resonating blocks which are coupled through coupling windows. With the dielectric cavity resonator according to the present disclosure, a parallel coupling topology can be used, based on which topology, the main-coupling and cross-coupling can be freely manipulated to fulfill the transmission function as required. The proposed coupling structures and coupling topology make it easier to control the cross-coupling. Furthermore, negative coupling and positive coupling can be more flexibly established, routed and placed. It also helps to realize better near band attenuation performance with less negative couplings, which benefits both near band spur and in band insertion loss. In addition to the improved harmonic parameter, the low-pass filter design can be simplified, thus improving the overall FU performance, especially the insertion loss. Therefore, it is efficient to produce with improved production consistency and accuracy. In view that the filter according to the present disclosure is flexible in design, it can be applicable to a macro station, thereby improving production efficiency and reducing production cost.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

The embodiments of the present disclosure are described in detail with reference to the accompanying drawings. It should be understood that these embodiments are discussed only for the purpose of enabling those skilled in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. Those skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 1:
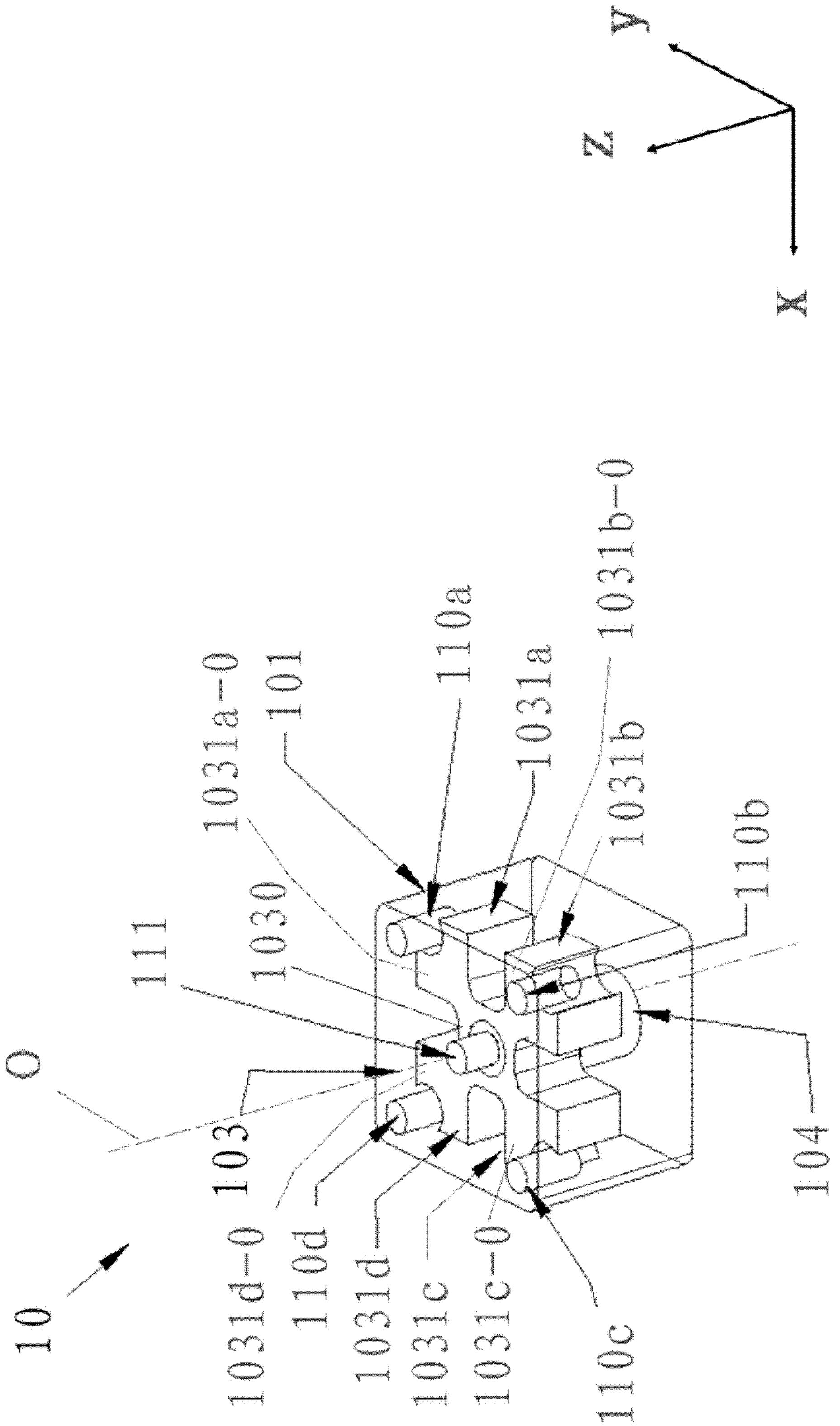
FIG. 1 shows a schematical view of a dielectric cavity resonator according to a first embodiment of the present disclosure.

FIG. 1 shows a perspective view of the dielectric cavity resonator 10 according to the first embodiment of the present disclosure. The dielectric cavity resonator comprises a metallic resonance cavity 101 having a cuboid shape (cubes or rectangular cuboids) defining three orthogonal axes x, y, z substantially aligned with walls of the metallic resonance cavity. The metallic resonance cavity is shown to have a central axis O extending in a z direction (namely, the vertical direction as shown in FIG. 1). In the x-y cross-section perpendicular to the z direction, the metallic resonance cavity is in a square shape.

Inside the metallic resonance cavity 101, a dielectric core 103 is loaded, which comprises: a central part 1030 extending coaxially with respect to the central axis of the metallic resonance cavity; and four columnar parts 1031*a*, 1031*b*, 1031*c*, 1031*d* arranged around the central part and integrally formed therewith. The dielectric core 103, as a whole, is formed of a single and one kind of dielectric material, for example, ceramic material. The ceramic material for the dielectric core has a QF value of 8000-100000 and a relative permittivity of 18-100. Ceramics used in microwave applications have high relative permittivity and low loss, and are temperature-stable.

Figure 2:
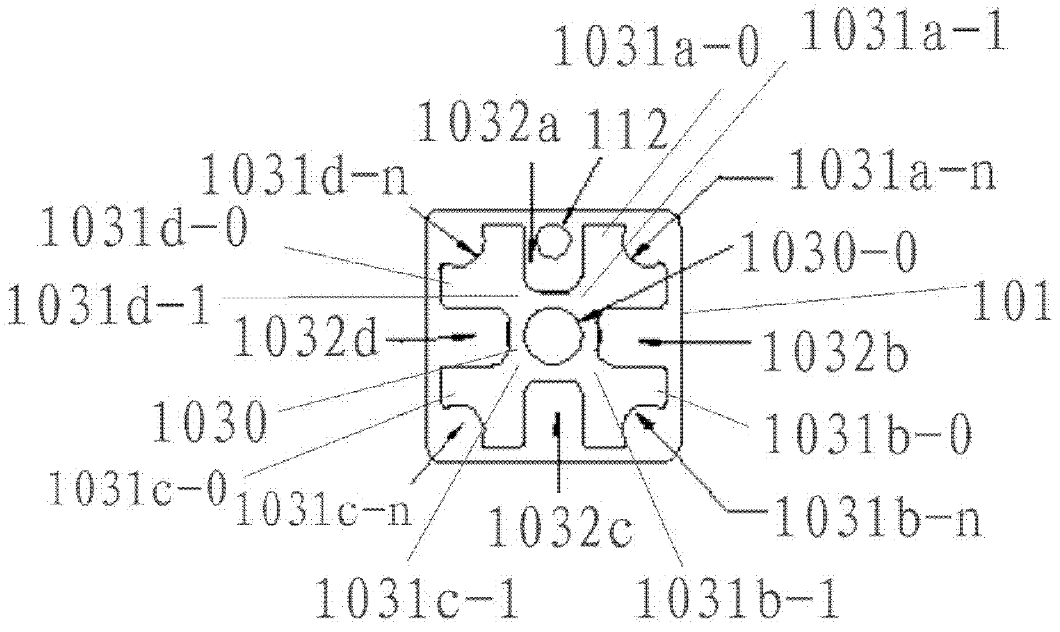
FIG. 2 shows a top view of the dielectric cavity resonator according to the first embodiment of the present disclosure, wherein the top wall of the metallic resonance cavity and some tuning screws are removed for the sake of clarity.

From FIGS. 1 and 2, it can be seen that, each columnar part extends in the z direction and has a petal-like shape in an arbitrary x-y cross-section perpendicular to the z direction. In each petal-like cross-section, each columnar part 1031*a*, 1031*b*, 1031*c*, 1031*d* extends in the direction of an adjacent corner area of corresponding square cross-section of the metallic resonance cavity. Every two adjacent columnar parts are spaced by a groove 1032*a*, 1032*b*, 1032*c*, 1032*d*. In the embodiment shown FIGS. 1 and 2, in each x-y cross-section, the groove 1032*a*, 1032*b*, 1032*c*, 1032*d* opens towards a center segment of an adjacent side of corresponding square cross-section of the metallic resonance cavity. The groove 1032*a*, 1032*b*, 1032*c*, 1032*d* can receive tuning screws 112 for tuning resonance frequency.

The dielectric core 103 is centrosymmetric and axisymmetric in arbitrary x-y cross-section. Although in the embodiments shown in FIGS. 1, 3 and 5-8, the central part is substantially square in a cross-section in the x-y plane, it is also possible that the cross-sectional contour of the central part may be round or in other regular shapes. In the center of the top surface of the central part, a central hole 1030-0 is provided for receiving a screw 111 therein. The central hole 1030-0 may extend through the central part 1030 of the dielectric core 103.

In the embodiment shown in FIGS. 1 and 2, an air gap remains between the peripheral boundary of the dielectric core and the interior surface of the wall of the metallic resonance cavity. The dielectric core 103 is supported by a support member 104 in the metallic resonance cavity 101. For example, the dielectric core 103 may be supported by a protrusion of the support member extending into the central hole 1030-0 from the bottom of the central part 1030. In this case, the central hole 1030-0 is also used as an installation hole. The support member 104 may be made of a material with low relative permittivity (approximately 2 to 10), such as alumina ceramic or plastic. The support member 104 and the dielectric core 103 may be cemented together and then screwed to the bottom of resonance cavity 101. In addition to a gluing method or a screwing method, other methods may also be applied to fix the support member 104 to the resonance cavity 101. Or, the dielectric core 103 can be directly mounted on the bottom of the metallic resonance cavity 101 without the use of a support member, for example, by welding the dielectric core 103 onto the bottom of the metallic resonance cavity with the aid of a silver coating on the bottom of the dielectric core 103.

According to the present disclosure, the height of the central part 1030 measured in the z direction is not greater than the height of a main body of each columnar part 1031*a*, 1031*b*, 1031*c*, 1031*d* when measured in the z direction. In the embodiment shown in FIG. 1, the central part 1030 has a same height as the columnar part, and further the top of the central part 1030 is arranged in flush with the top of the columnar parts 1031*a*, 1031*b*, 1031*c*, 1031*d* and the bottom of the central part is also in flush with the bottom of the columnar parts. That is, the central part 1030 and the columnar parts 1031*a*, 1031*b*, 1031*c*, 1031*d* are coplanar with each other in both top and bottom surfaces.

Figure 8:
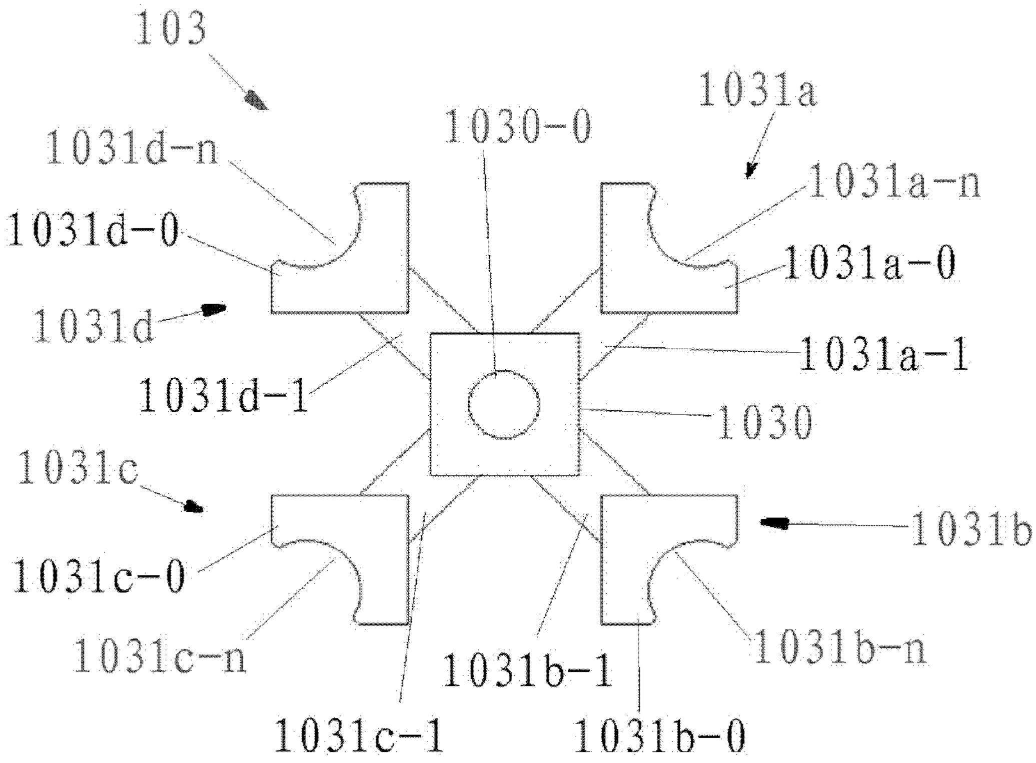
FIG. 8 shows a top view of the dielectric core of the dielectric cavity resonator according to a fifth embodiment of the present disclosure.

From FIG. 2, it can be seen that the main bodys 1031*a*-0, 1031*b*-0, 1031*c*-0, 1031*d*-0 of columnar parts 1031*a*, 1031*b*, 1031*c*, 1031*d* smoothly merge into the central part 1030 via transition portions 1031*a*-1, 1031*b*-1, 1031*c*-1, 1031*d*-1 which may have the same height as the central part 1030. In the embodiment shown in FIGS. 1 and 2, the transition portions 1031*a*-1, 1031*b*-1, 1031*c*-1, 1031*d*-1 are formed as necks between the central part 1030 and the main body 1031*a*-0, 1031*b*-0, 1031*c*-0, 1031*d*-0 of the columnar parts. Of course, they can be shaped as structs which are elongate in the cross-section in the x-y plane, for example, as shown clearly in FIG. 8. Furthermore, as shown in FIG. 8, the transition portions 1031*a*-1, 1031*b*-1, 1031*c*-1, 1031*d*-1 may be staggered with respect to the central part 1030 and the main bodys 1031*a*-0, 1031*b*-0, 1031*c*-0, 1031*d*-0 of the columnar parts. Also, the central part 1030 and the columnar parts 1031*a*, 1031*b*, 1031*c*, 1031*d* may be arranged in a staggered manner in the z direction, as clearly shown in FIGS. 3-5 and 8.

Figure 6:
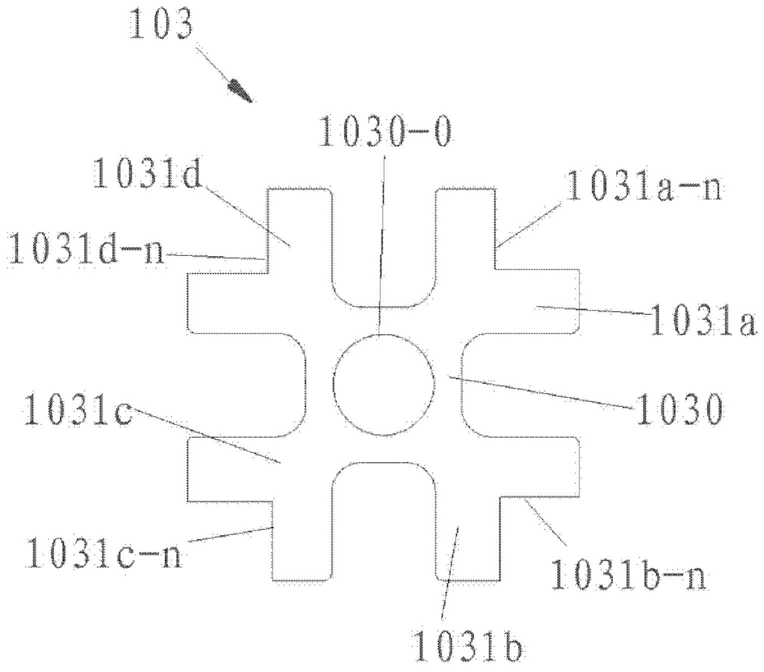
FIG. 6 shows a top view of the dielectric core of the dielectric cavity resonator according to a third embodiment of the present disclosure.
Figure 7:
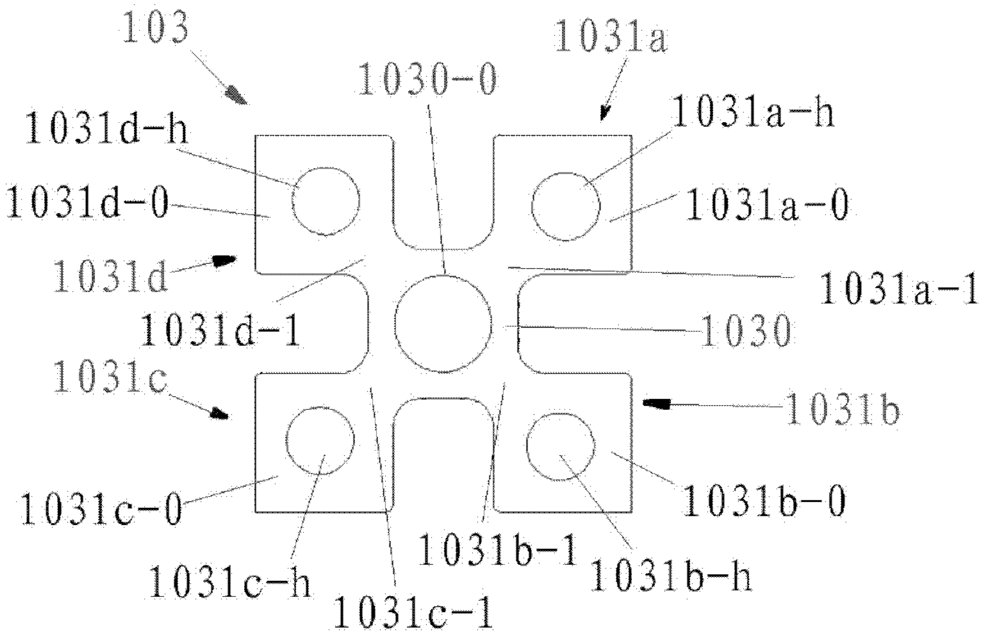
FIG. 7 shows a top view of the dielectric core of the dielectric cavity resonator according to a fourth embodiment of the present disclosure.

In FIGS. 1 and 2, at an edge area of each columnar part that points to an adjacent corner area of the metallic resonance cavity 101, an arc-shaped notch 1031*a*-*n*, 1031*b*-*n*, 1031*c*-*n*, 1031*d*-*n* is provided, extending in the z direction and opening towards the corner area. The notches can be used for receiving tuning crews 110*a*, 110*b*, 110*c*, 110*d*. It is also envisaged that the notch can be shaped as a right angle in the cross-section in the x-y plane, as shown in FIG. 6. As a variant shown in FIG. 7, the petal-like cross-section of each columnar part is generally square shaped, and the main body 1031*a*-0, 1031*b*-0, 1031*c*-0, 1031*d*-0 of each columnar part is provided with a hole 1031*a*-*h*, 1031*b*-*h*, 1031*c*-*h*, 1031*d*-*h* extending in the z direction for receiving a tuning screw.

Hereinbelow, for ease of description, a technical term "cross-sectional characterizing dimension" is introduced for describing the cross-sectional size of the central part. As described in the above, the cross-section of the central part 1030 in the x-y plane can be configured in any centrosymmetric and axisymmetric shape, for example, square, hexagonal, octagonal, or round, etc. In case of a square cross-section, the cross-sectional characterizing dimension for the central part is represented by "side length" of the square shape. In case that the cross-section of the central part 1030 in the x-y plane is in other shapes than square, the cross-sectional characterizing dimension for the central part refers to the diameter or the diameter of the circumscribed circle for the cross-sectional contour of the central part.

For the dielectric core 103, the technical term "cross-sectional maximum side length" means the side length of an imaginary enveloping boundary with a square-shaped x-y cross-section, by which boundary the whole dielectric core is enclosed in the x-y plane. The imaginary enveloping boundary is coaxial with the resonance cavity and their diagonal planes coincide with each other, at least over the extension of columnar parts in the z direction. The distance between the sides of the imaginary enveloping boundary and corresponding walls of the metallic resonance cavity can be considered as minimum among the air gaps between the dielectric core and the walls of the metallic resonance cavity.

Figure 3:
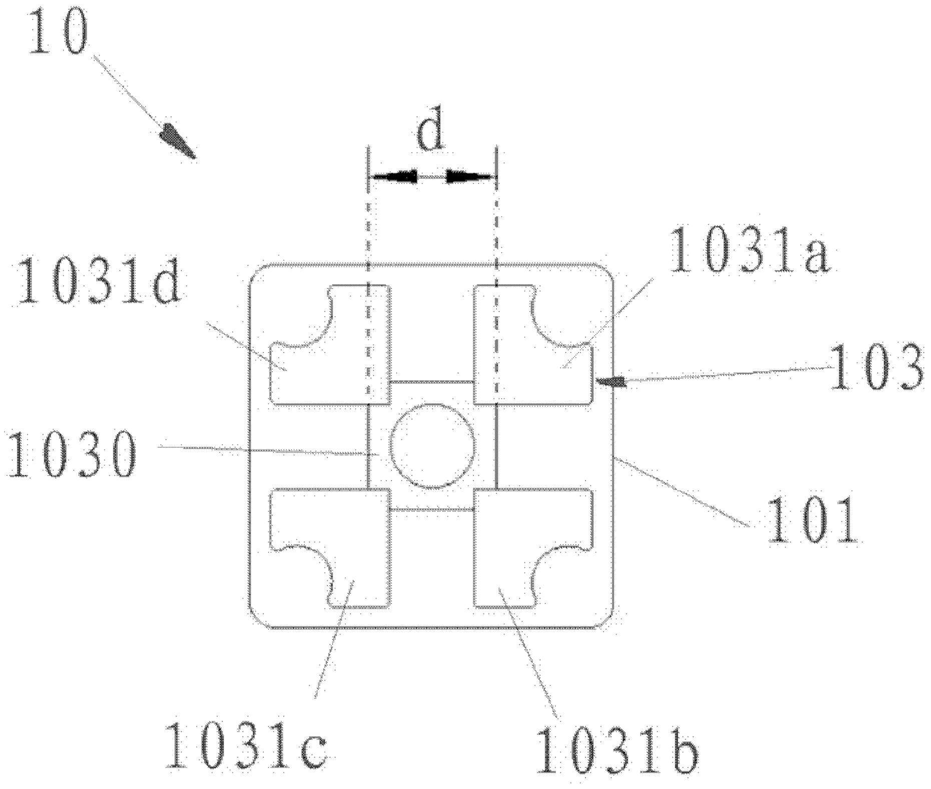
FIG. 3 shows a top view of the dielectric cavity resonator according to a second embodiment of the present disclosure.
Figure 4:
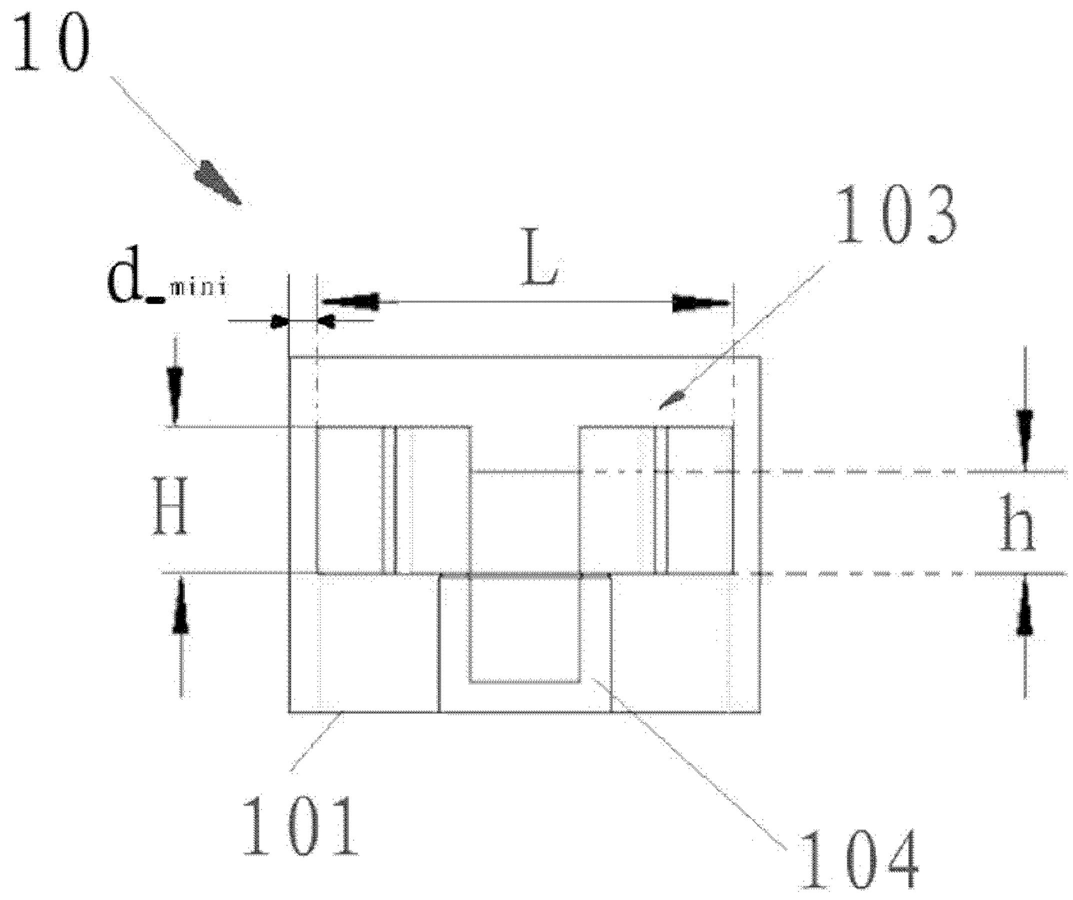
FIG. 4 shows a side view of the dielectric cavity resonator according to the second embodiment of the present disclosure.
Figure 5:
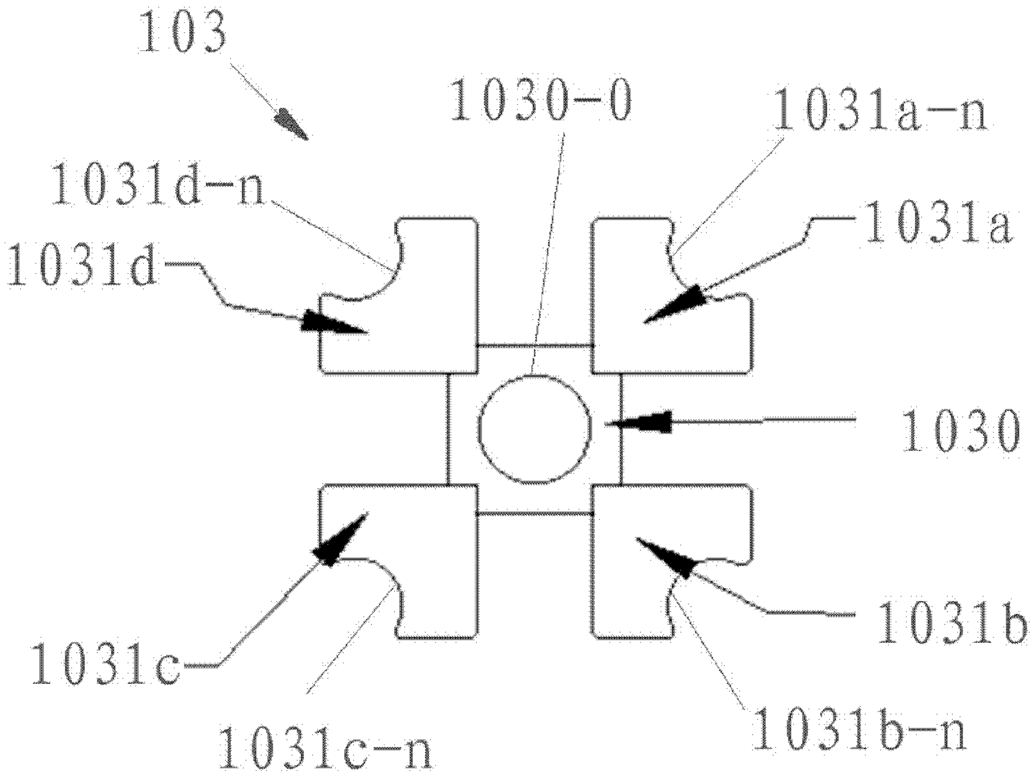
FIG. 5 shows a top view of a dielectric core of the dielectric cavity resonator according to the second embodiment of the present disclosure.

As shown in FIGS. 3 and 4, the cross-sectional characterizing dimension for the central part is indicated by "d", and the height of the central part measured in the z direction is indicated by "h". The cross-sectional maximum side length of the dielectric core is indicated by "L", and the height of the columnar parts measured in the z direction is indicated by "H".

According to the present disclosure, the minimum distance d_mini between the dielectric core and walls of the metallic resonance cavity is within 1%-20%, preferably 3%-15% of a cross-sectional maximum side length L of the dielectric core. The smaller the minimum distance between the imaginary enveloping boundary of the dielectric core and the walls of the metallic resonance cavity is, the lower the HE two-mode resonant frequency of the dielectric core will be, but at the same time, the Q value will decrease gradually. The Q value can be reduced by at least 40% when the dielectric core is in contact with the walls of the resonance cavity.

According to the present disclosure, the dielectric cavity resonator is configured in such a shape that the number of the modes of the dielectric cavity resonator can be reduced by decreasing a ratio of the height (h) of the central part to the height (H) of the main body of the columnar part and/or the ratio of a cross-sectional characterizing dimension (d) of the central part to the height (h) of the central part. That is, the shape of the dielectric core 103 is configured in such a manner that it can be practically changed in terms of the height/cross-sectional characterizing dimension of the central part 1030 and/or the height (H) of the main body of the columnar part 1031*a*, 1031*b*, 1031*c*, 1031*d* so as to support resonant modes corresponding to different predetermined resonant frequencies. For example, the height/cross-sectional characterizing dimension of the central part 1030 and/or the height (H) of the main body of the columnar part can be reduced by a grinding method. Thus, a multi-mode resonator having at least three resonant peaks at different predetermined frequencies can be obtained in a single physical body, thereby reducing the overall size and the manufacturing cost.

Figure 9:
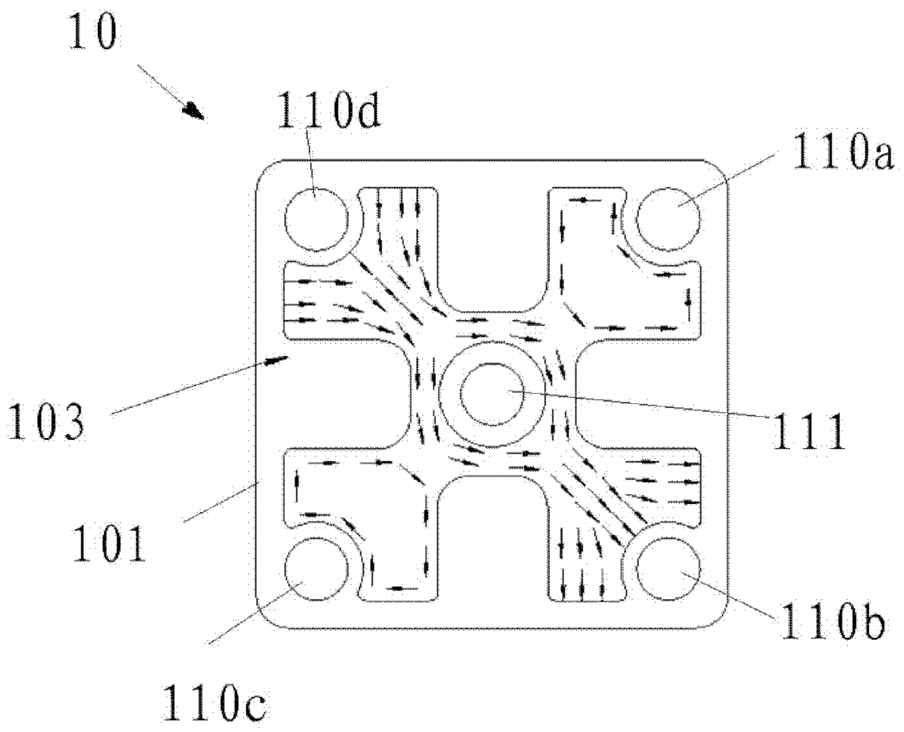
FIG. 9 shows E-field (x-y) in mode-1 in the dielectric core of the dielectric cavity resonator according to the first embodiment of the present disclosure.

In the dielectric cavity resonator, the pair of columnar parts in one pair of diagonal positions of the dielectric core may produce the first mode, while the other pair of columnar parts in the other pair of diagonal positions of the dielectric core may produce the second mode. These two modes are the same, forming an angle of 90 degrees. The first mode is shown in FIG. 9. The direction of the main electric field is from northwest to southeast, and there are two closed loop rotating electric fields in the area of the columnar parts in northeast and southwest positions. The second mode is shown in FIG. 10, in which the direction of the main electric field is from southwest to northeast, and there are two closed loop rotating electric fields in the area of the columnar parts in northwest and southeast positions.

Figure 10:
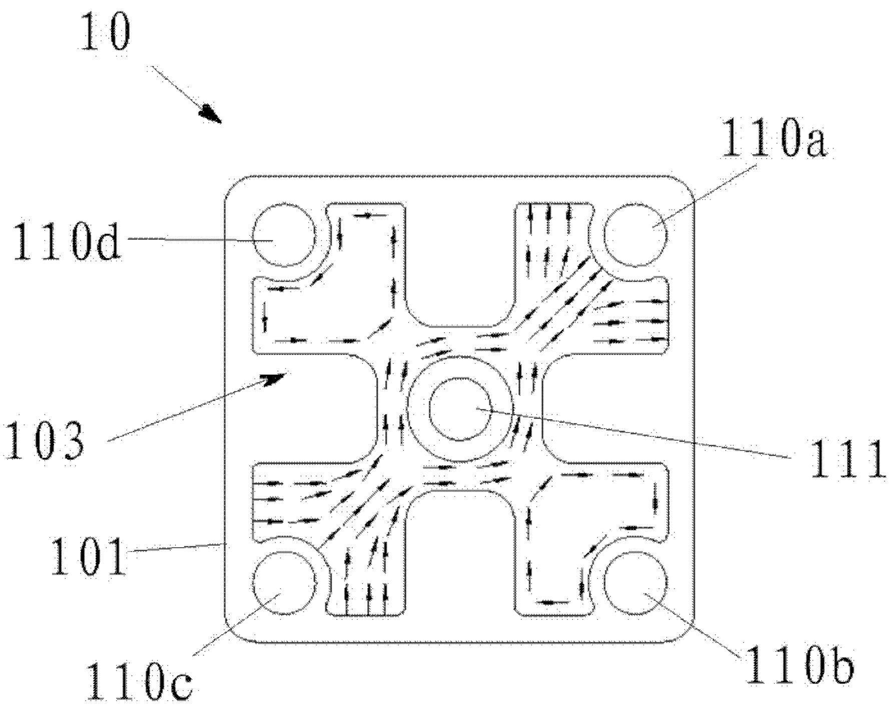
FIG. 10 shows E-field (x-y) in mode-2 in the dielectric core of the dielectric cavity resonator according to the first embodiment of the present disclosure.
Figure 11:
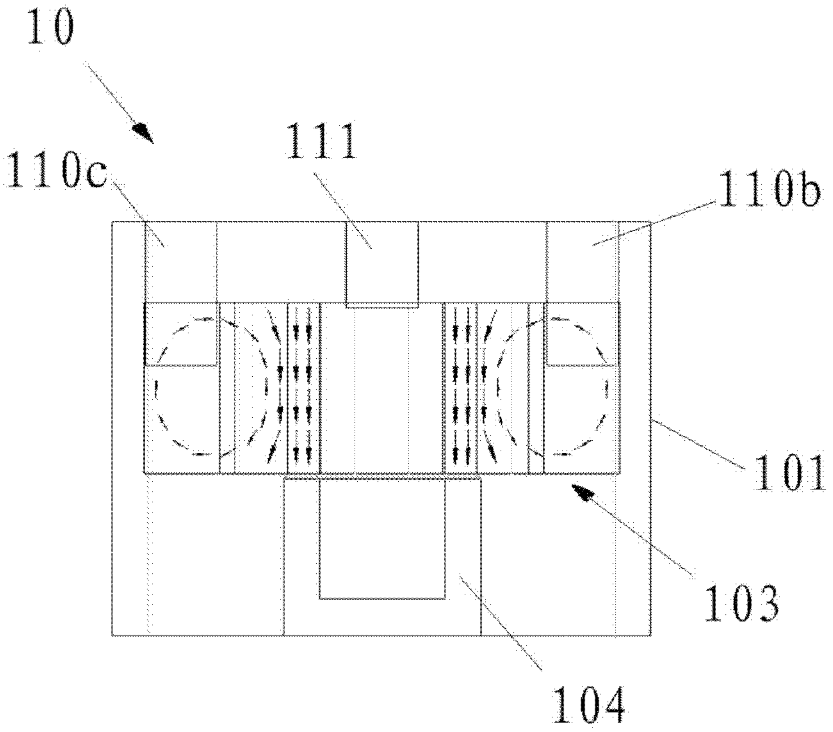
FIG. 11 shows E-field (z) in mode-3 in the dielectric core of the dielectric cavity resonator according to the first embodiment of the present disclosure.
Figure 12:
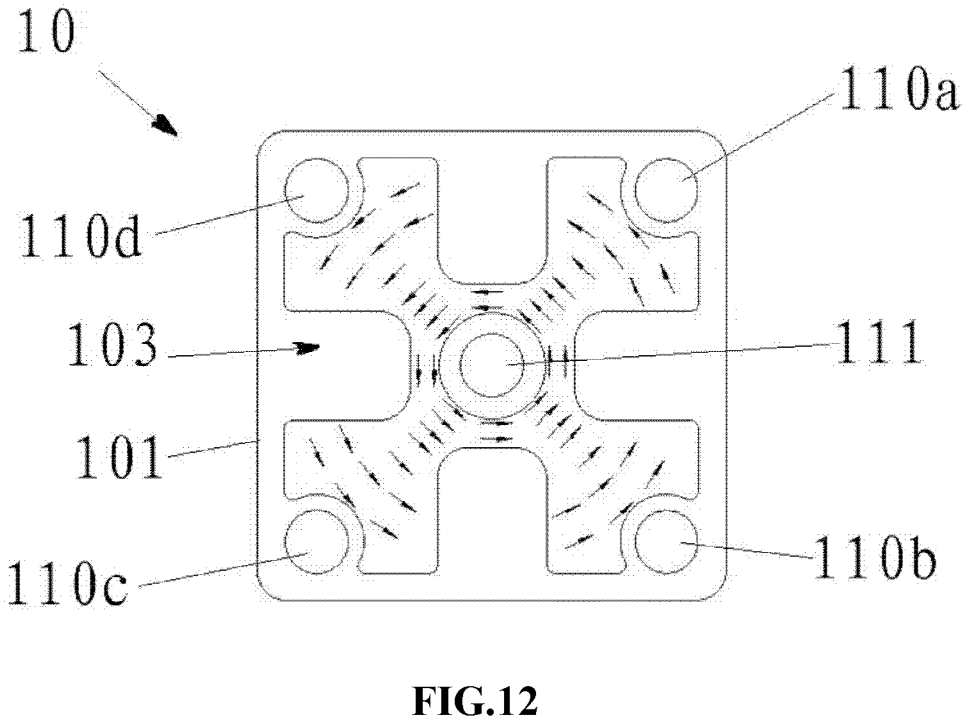
FIG. 12 shows TE mode in the dielectric core of the dielectric cavity resonator according to the first embodiment of the present disclosure.

When the ratio of the height of the central part 1030 to the height of the columnar part 1031*a*, 1031*b*, 1031*c*, 1031*d*, i.e. h/H, is greater than 60% and no more than 100%, and the ratio of the cross-sectional characterizing dimension of the central part 1030 to the height of the central part, i.e. d/h, is greater than 100%, the resonator becomes a four-mode resonator, having HE modes shown in FIGS. 9 and 10, a TM mode shown in FIG. 11, and a TE mode shown in FIG. 12.

When the ratio of the height of the central part 1030 to the height of the columnar part 1031*a*, 1031*b*, 1031*c*, 1031*d*, i.e. h/H, is greater than 60% and no more than 100%, and the ratio of the cross-sectional characterizing dimension of the central part to the height of the central part, i.e. d/h, is greater than 40% and no more than 100%, the resonator becomes a three-mode resonator, having a TM mode or a HE (z) mode as a third mode in addition to the two modes generated by the two pairs of columnar parts diagonally positioned.

When the ratio of the height of the central part 1030 to the height of the columnar part 1031*a*, 1031*b*, 1031*c*, 1031*d*, i.e. h/H, is within 20%-60%, and the ratio of the cross-sectional characterizing dimension of the central part to the height of the central part, i.e. d/h, is within 20%-80%, the resonator becomes a dual-mode resonator having only the two modes generated by the two pairs of columnar parts diagonally positioned.

From the above, it can be seen that the modes of the dielectric cavity resonator can be changed by making adjustment on the ratio h/H and/or the ratio d/h. The screw inserted at the notches of the columnar parts can be used to adjust the frequency of dielectric cavity resonator for the HE (x-y) mode. And the screw inserted into the central hole 1030-0 of the central part 1030 may be used to adjust the frequency of the dielectric cavity resonator for the HE (z) mode.

Figure 13:
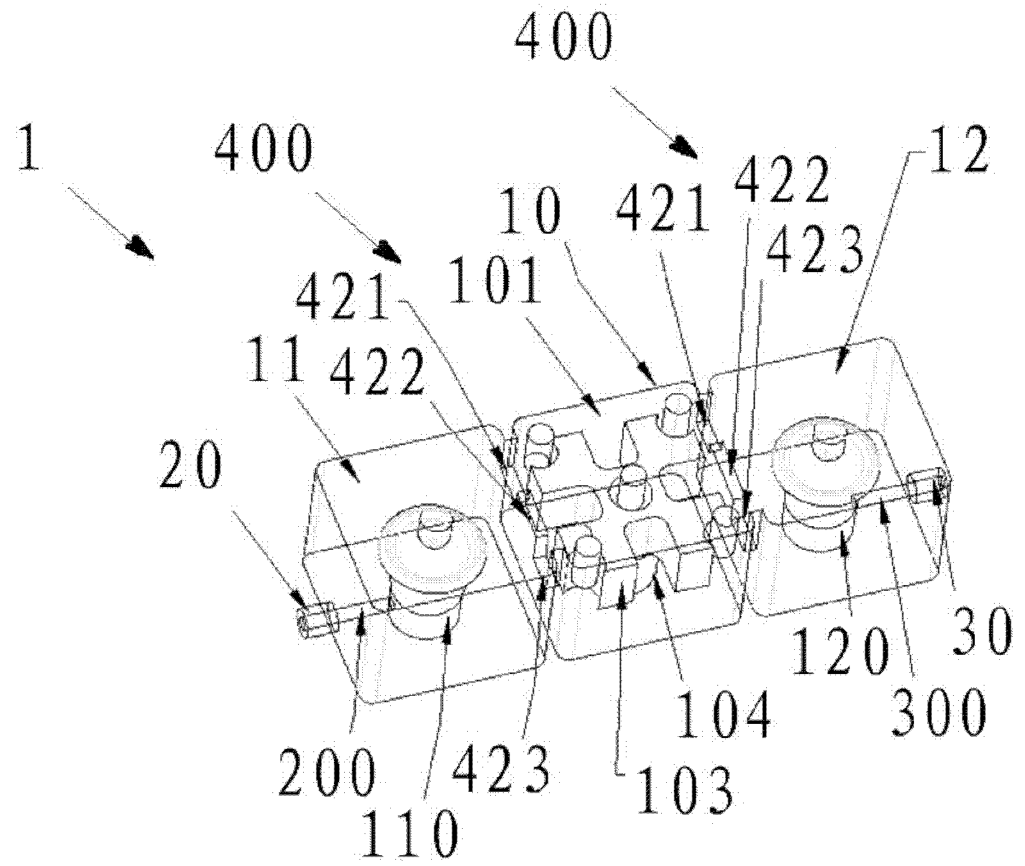
FIG. 13 shows a perspective view of a dielectric cavity filter according to the present disclosure.

FIG. 13 illustrates an example of an RF filter in the form of a dielectric cavity filter 1 comprising a dielectric cavity resonator 10 described in the above. The example filter in FIG. 13 is a 5th-order microwave bandpass filter consisting of a dielectric cavity resonator 10 and a first coaxial resonator 11 and a second coaxial resonator 12 placed on the opposite sides of the dielectric cavity resonator 10. The first and second coaxial resonators are coupled to the dielectric cavity resonator 10 via coupling windows 400.

Figure 14:
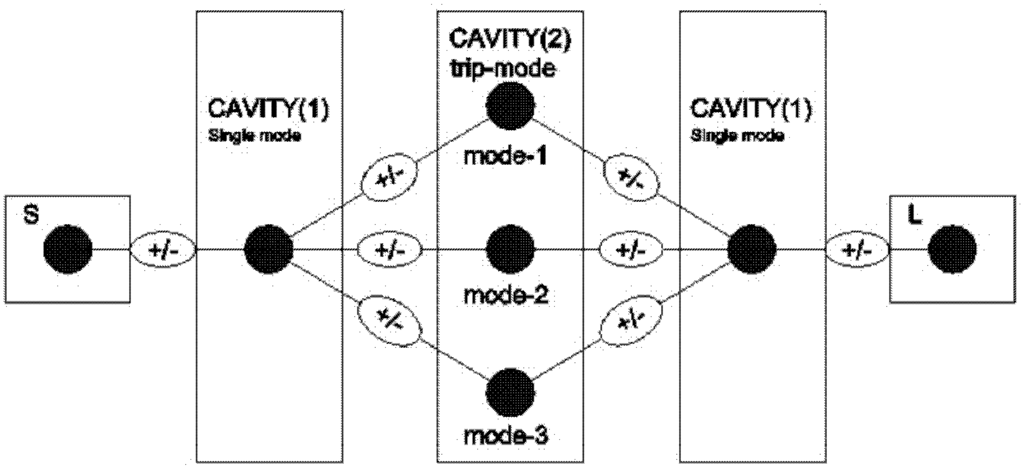
FIG. 14 shows a topology of the dielectric cavity filter according to the present disclosure.
Figure 16:
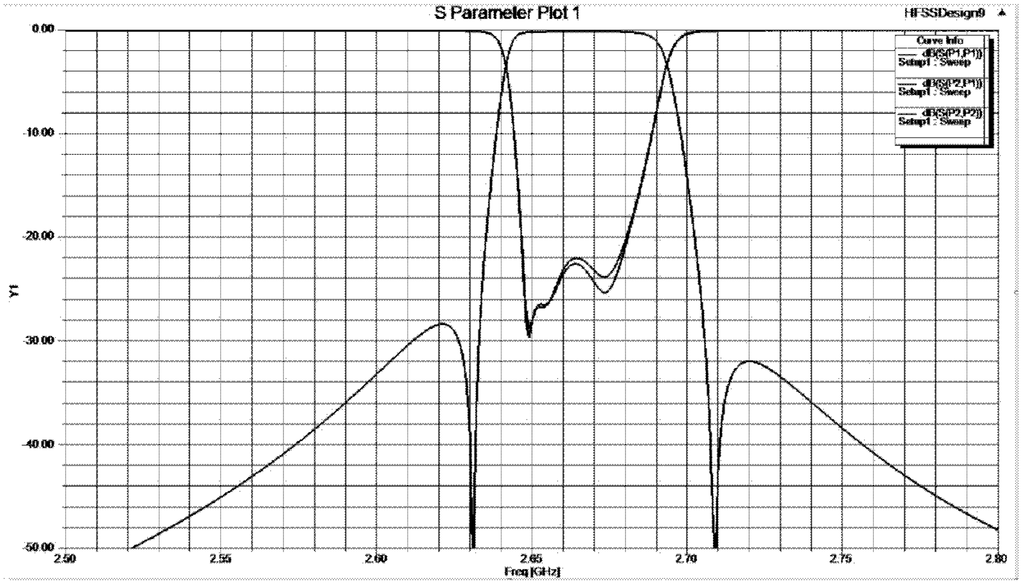
FIG. 16 shows the S parameter of the dielectric cavity filter according to the present disclosure.

The first coaxial resonator 11 may be a quasi TEM mode resonator provided with a resonance element 110. A coaxial line 20, such as a coaxial cable or connector, is connected to a first coaxial resonator 11 via a transmission line such as a wire 200. The coaxial cavity resonance of the first coaxial resonator 11 is simultaneously coupled to three modes in the dielectric core 103 of the dielectric cavity resonator 10. Coupling windows 400 within, or forming part of, walls of the resonance cavity of the dielectric cavity resonator 10 are formed for transferring signals to or from the resonant modes corresponding to the different predetermined resonant frequencies of the dielectric core 103 of the dielectric cavity resonator 10 in parallel. Signals then are output from the resonance element 120 of the second coaxial resonator 12 via the transmission lines 300 and the connectors 30. FIG. 14 shows the topology of the dielectric cavity filter 1 in which the dielectric cavity resonator 10 is a three-mode resonator. And FIG. 16 shows the S parameter of the dielectric cavity filter 1.

The first two modes HE (x+y) of the second coaxial resonator 12 and the dielectric core 103 of the dielectric cavity resonator 10 have an orthogonal magnetic field, so the magnetic field coupling remains very low and is often used to generate cross coupling of zeros, while the second coaxial resonator 12 and TM (z) mode of the dielectric cavity resonator 10 have a parallel magnetic field, so the magnetic field coupling remains relatively high and is often used for primary coupling. Coupling can be controlled, for example, by changing the depth and width of the coupling windows 400.

Figure 15A:
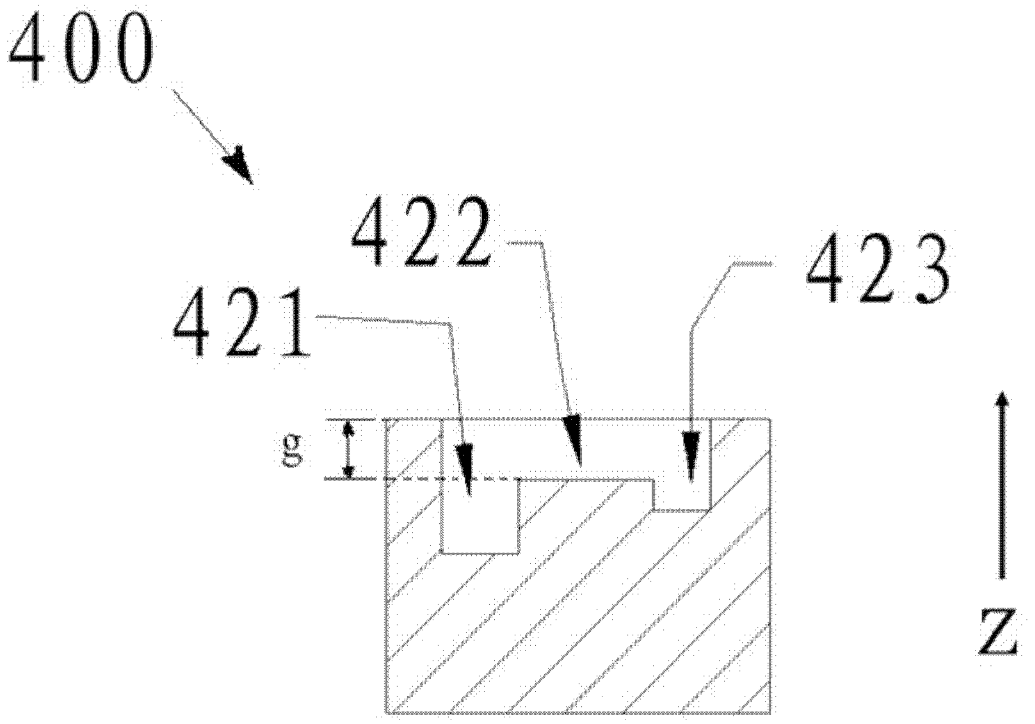
FIG. 15A and FIG. 15B show different variants of coupling windows for the dielectric cavity filter respectively.
Figure 15B:
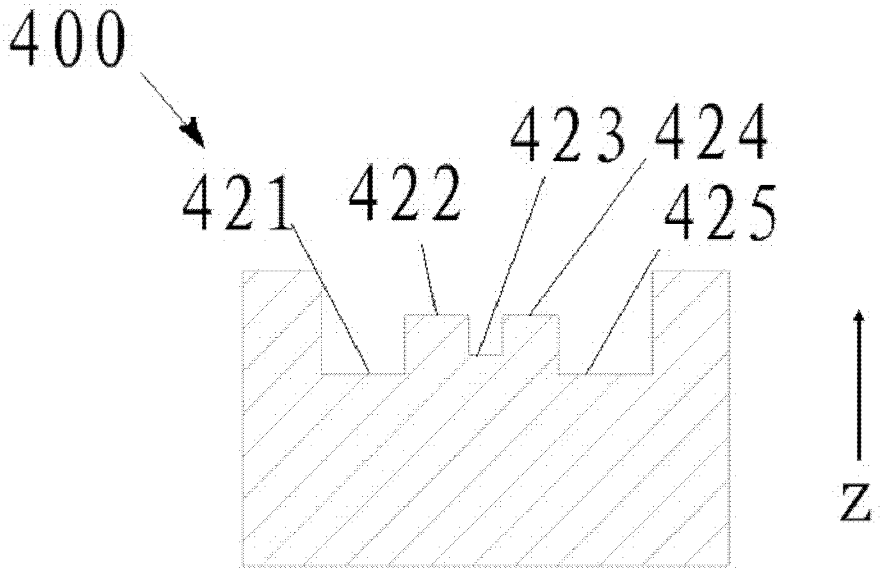

Specifically, as seen from FIGS. 15A and 15B, the coupling windows 400 are embodied in the form of apertures that are opened in the z direction and have at least one concave portion and at least one convex portion provided on their bottoms. In the example shown in FIG. 15A, there are two concave portions 421, 423 and one convex portion 422 in the bottom of the coupling window. While in FIG. 15B, there are three concave portions 421, 423, 425 and two convex portions 422, 424 in the bottom of the coupling window. As shown in FIGS. 15A and 15B, each coupling window can be deemed as having several sub-windows in rectangular or square shapes arranged next to each other along the widthwise direction of the opening. The concave portions and the convex portions are defined by the staggered bottoms of the sub-windows. The vertical gap g between the top of the convex portion 422 and the top of the wall may arrange from 1 to 8 mm. Coupling value increases as the depth of the concave portion of the coupling window is increased. The coupling window can be designed to have portions located in the central area of the cavity wall (for example, the concave portion 423 shown in FIG. 15B) or on either side (for example, the concave portions 421, 425 shown in FIG. 15B) to increase cross-coupling and minimize parasitic coupling, which is often used in multi-mode designs.

The dielectric cavity resonator according to the present disclosure enables that the overall shape of the dielectric core 103 can be designed flexibly. For example, the central part 1030 of the dielectric core 103 may be cylindrical or cuboid, but not limited to those listed. Additionally, since the ceramic material for the dielectric core 103 has high dielectric constant, it is possible to form dual-mode/triple-mode/four-mode resonance in closed boundary conditions. Furthermore, it is possible that effective and productive strong main/negative/capacitive coupling solutions can be easily adopted according to practical needs, which can help to realize coupling value and shape very flexibly.

References in the present disclosure to "an embodiment", "another embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A dielectric cavity resonator, comprising:

a metallic resonance cavity having a cuboid shape defining three orthogonal axes x, y, z substantially aligned with walls of the metallic resonance cavity and having a central axis extending in the z direction;

a dielectric core provided in the metallic resonance cavity, the dielectric core comprising: a central part extending coaxially with respect to the central axis of the metallic resonance cavity; and four columnar parts arranged around the central part and integrally formed with the central part and each extending in the z direction and having a petaloid shape in an x-y cross-section perpendicular to the z direction, every two adjacent columnar parts being spaced by a groove, the dielectric core being centrosymmetric and axisymmetric in each x-y cross-section perpendicular to the z direction, wherein the metallic resonance cavity has a square cross-section, and in each petaloid cross-section, each columnar part extends in a direction of an adjacent corner area of corresponding square cross-section of the metallic resonance cavity, and a height of the central part is not greater than a height of a main body of each columnar part when measured in the z direction, wherein the petaloid cross-section of each columnar part is generally square shaped, and wherein each columnar part is provided with a hole extending in the z direction for receiving a tuning screw.

2. The dielectric cavity resonator of claim 1, wherein, in each x-y cross-section, the groove opens towards a center segment of an adjacent side of a corresponding square cross-section of the metallic resonance cavity.

3. The dielectric cavity resonator of claim 1, wherein the dielectric core is designed in such a shape that the number of the modes of the dielectric cavity resonator can be reduced by decreasing a ratio of the height of the central part to the height of the main body of the columnar part and/or a ratio of a cross-sectional characterizing dimension of the central part to the height of the central part.

4. The dielectric cavity resonator of claim 1, wherein a ratio of the height of the central part to the height of the main body of the columnar part is greater than 60% and no more than 100% and a ratio of a cross-sectional characterizing dimension of the central part to the height of the central part is greater than 100% and the dielectric cavity resonator is a four-mode resonator.

5. The dielectric cavity resonator of claim 1, wherein when a ratio of the height of the central part to the height of the main body of the columnar part is greater than 60% and no more than 100% and a ratio of a cross-sectional characterizing dimension of the central part to the height of the central part is greater than 40% and no more than 100% and the dielectric cavity resonator is a three-mode resonator.

6. The dielectric cavity resonator of claim 1, wherein when a ratio of the height of the central part to the height of the main body of the columnar part is within 20%-60% and a ratio of a cross-sectional characterizing dimension of the central part to the height of the central part is within 20%-80% and the dielectric cavity resonator is a dual-mode resonator.

7. The dielectric cavity resonator of claim 1, wherein, a minimum distance between the dielectric core and walls of the metallic resonance cavity is within 3%-15% of a cross-sectional maximum side length of the dielectric core.

8. The dielectric cavity resonator of claim 1, wherein the columnar parts and the central part are molded in one piece and transition portions of the columnar parts that are located between the central part and the main bodies of the columnar parts each have a height same as or different from the height of the main bodies of the columnar parts.

9. The dielectric cavity resonator of claim 1, wherein the dielectric core is made of a ceramic material which has a QF value of 8000-100000 and a relative permittivity of 18-100.

10. The dielectric cavity resonator of claim 1, wherein the central part is round or square or in other regular shapes in an x-y cross-section perpendicular to the z direction.

11. The dielectric cavity resonator of claim 1, wherein the central part has a central hole formed therein as an installation hole or a hole for receiving a tuning screw.

12. The dielectric cavity resonator of claim 1, wherein a support member is provided within the metallic resonance cavity for supporting the dielectric core.

13. A dielectric cavity filter comprising a dielectric cavity resonator according to claim 1.

14. The dielectric cavity filter of claim 13, wherein it comprises a first coaxial resonator and a second coaxial resonator placed on opposite sides of the dielectric cavity resonator, the first and second coaxial resonators being coupled to the dielectric cavity resonator via coupling windows.

15. The dielectric cavity filter of claim 14, wherein the coupling windows are in the form of apertures that are opened in the z direction and have at least one concave portion and at least one convex portion provided on their bottoms.

* * * * *